US007423519B2

(12) United States Patent
Yanagida et al.

(10) Patent No.: US 7,423,519 B2
(45) Date of Patent: Sep. 9, 2008

(54) VEHICULAR POWER LINE COMMUNICATION SYSTEM

(75) Inventors: Yo Yanagida, Shizuoka (JP); Naoyuki Shiraishi, Shizuoka (JP); Atsushi Kawamura, Shizuoka (JP); Terumitsu Sugimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 218 days.

(21) Appl. No.: 11/191,039

(22) Filed: Jul. 28, 2005

(65) Prior Publication Data

US 2006/0038445 A1 Feb. 23, 2006

(30) Foreign Application Priority Data

Jul. 30, 2004 (JP) ............................. 2004-223502

(51) Int. Cl.
*G05B 11/01* (2006.01)
*G08B 1/00* (2006.01)
*H04B 1/00* (2006.01)

(52) U.S. Cl. ........................... 340/310.11; 340/310.15; 340/538; 340/425.5

(58) Field of Classification Search ................ None
See application file for complete search history.

(56) References Cited

U.S. PATENT DOCUMENTS

| 5,864,243 A | * | 1/1999 | Chen et al. ............... 326/58 |
| 6,629,032 B2 | * | 9/2003 | Akiyama ................... 701/48 |
| 2003/0076221 A1 | * | 4/2003 | Akiyama et al. .......... 340/310.01 |
| 2004/0207262 A1 | * | 10/2004 | Yanagida et al. ............ 307/10.1 |
| 2006/0197378 A1 | * | 9/2006 | Nagasawa et al. ............ 307/9.1 |
| 2006/0274467 A1 | * | 12/2006 | Nagasawa ..................... 361/62 |

FOREIGN PATENT DOCUMENTS

| GB | 2 348 349 A | | 9/2000 |
| JP | 2003-143043 | | 5/2003 |
| JP | 2004-056197 | | 2/2004 |
| JP | 2006042276 A | * | 2/2007 |
| JP | 2003191804 A | * | 7/2007 |

OTHER PUBLICATIONS

Official Action issued by the German Patent and Trademark Office in corresponding German Patent Application No. 10 2005 035 664.8-31 on Dec. 17, 2007.

* cited by examiner

*Primary Examiner*—Julie Lieu
(74) *Attorney, Agent, or Firm*—Finnegan, Henderson, Farabow, Garrett & Dunner, L.L.P.

(57) ABSTRACT

Plural communication areas are provided, and plural electronic control units for mutually making communication in each of the communication areas are provided. A vehicular power line communication system includes a power line coupling the respective communication areas to one another, branch power lines coupling the respective electronic control units in each of the communication areas to one another, and a battery for supplying electric power to the electronic control units through the power line and the branch power lines. The power line is formed of a +B line turning to a positive polarity and a ground line turning to a negative polarity, which are cabled to be spaced from each other in a part of the power line. The branch power lines superpose communication data thereon, thereby making data communication.

9 Claims, 10 Drawing Sheets

VEHICULAR POWER LINE COMMUNICATION SYSTEM

BACKGROUND OF THE INVENTION

1. Field of the Invention

The present invention relates to a vehicular power line communication system for superposing communication data among respective electronic control units (ECUs) on power lines for supplying electric power to respective instruments mounted on a vehicle, thereby making communication.

2. Description of the Related Art

In a vehicle in recent years, a power line communication system has been proposed in order to make data communication among various ECUs, for example, as disclosed in Japanese Patent Laid-Open Publication No. 2004-56197.

The power line communication system superposes communication data among ECUs mounted on the vehicle on power lines cabled in order to supply electric power to the respective ECUs, thus making it possible to reduce the number of harnesses connecting the respective ECUs to one another.

Figure 1:
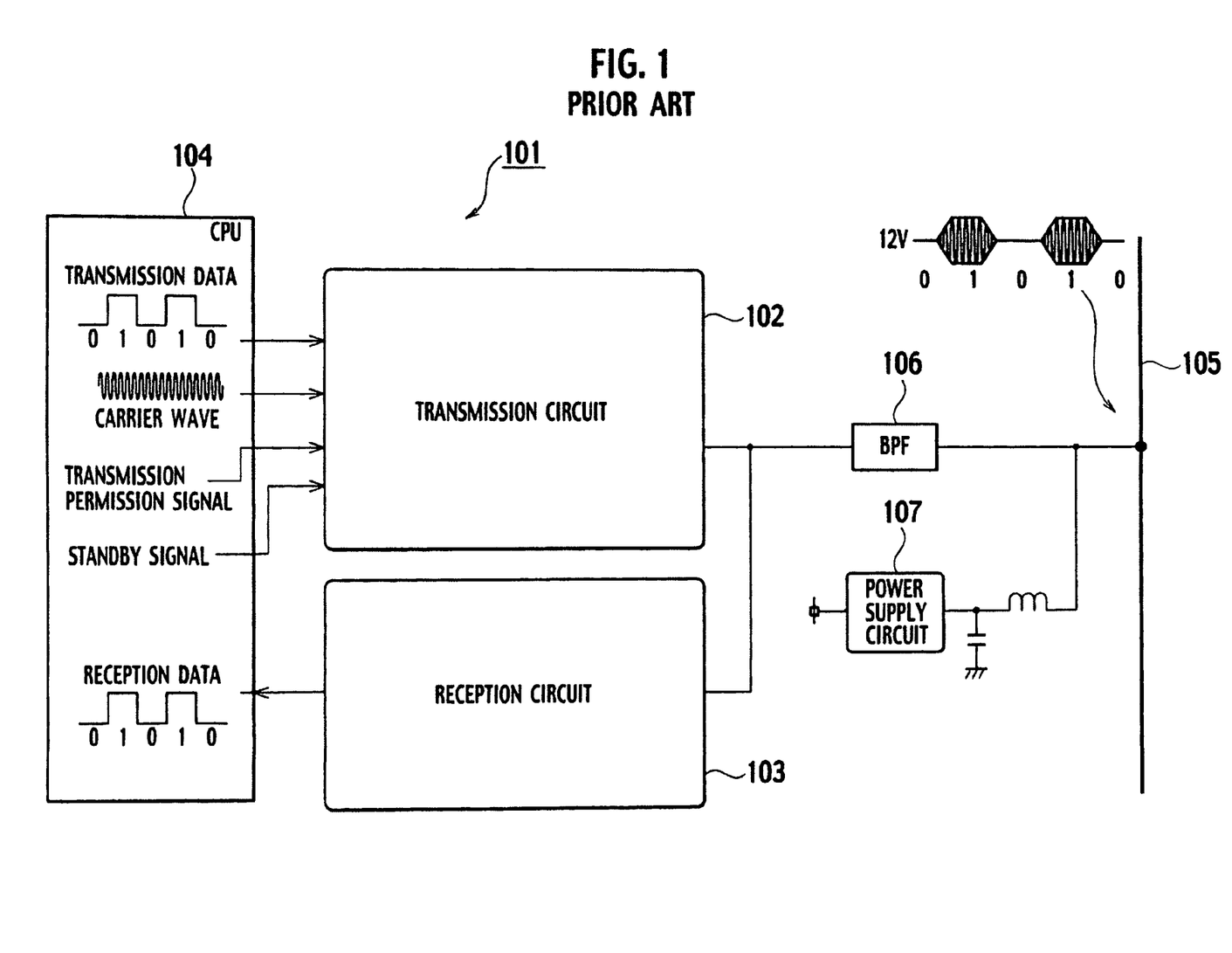
FIG. 1 is a block diagram showing a configuration of a conventional power line communication system.

FIG. 1 is a block diagram showing a configuration of an ECU connected to the power line of a conventional power line communication system. As illustrated, an ECU 101 is coupled to a power line 105, and includes a transmission circuit 102 performing ASK (Amplitude Shift Keying) modulation, a reception circuit 103 performing ASK demodulation, and a CPU 104 for controlling transmission/reception of the data by the transmission circuit 102 and the reception circuit 103 and controlling loads (not shown) mounted on the vehicle.

Furthermore, the ECU 102 includes a band pass filter (BPF) 106 provided between the power line 105 for supplying a drive voltage (for example, 12V) to the ECU 101 and the transmission circuit 102 and the reception circuit 103, and a power supply circuit 107 for converting the drive voltage supplied through the power line 105 into a voltage of a desired level.

In the case of transmitting the data, transmission data, a carrier wave, a transmission permission signal and a standby signal are outputted from the CPU 104 to the transmission circuit 102, and the transmission data is ASK-modulated by the transmission circuit 102 and superposed on the power line 105.

Meanwhile, in the case of receiving transmission data transmitted from another ECU, which is superposed on the power line 105, this transmission data is captured into the reception circuit 103 through the band pass filter (BPF) 106 and ASK-demodulated there, and it is thus made possible to obtain reception data.

Figure 2:
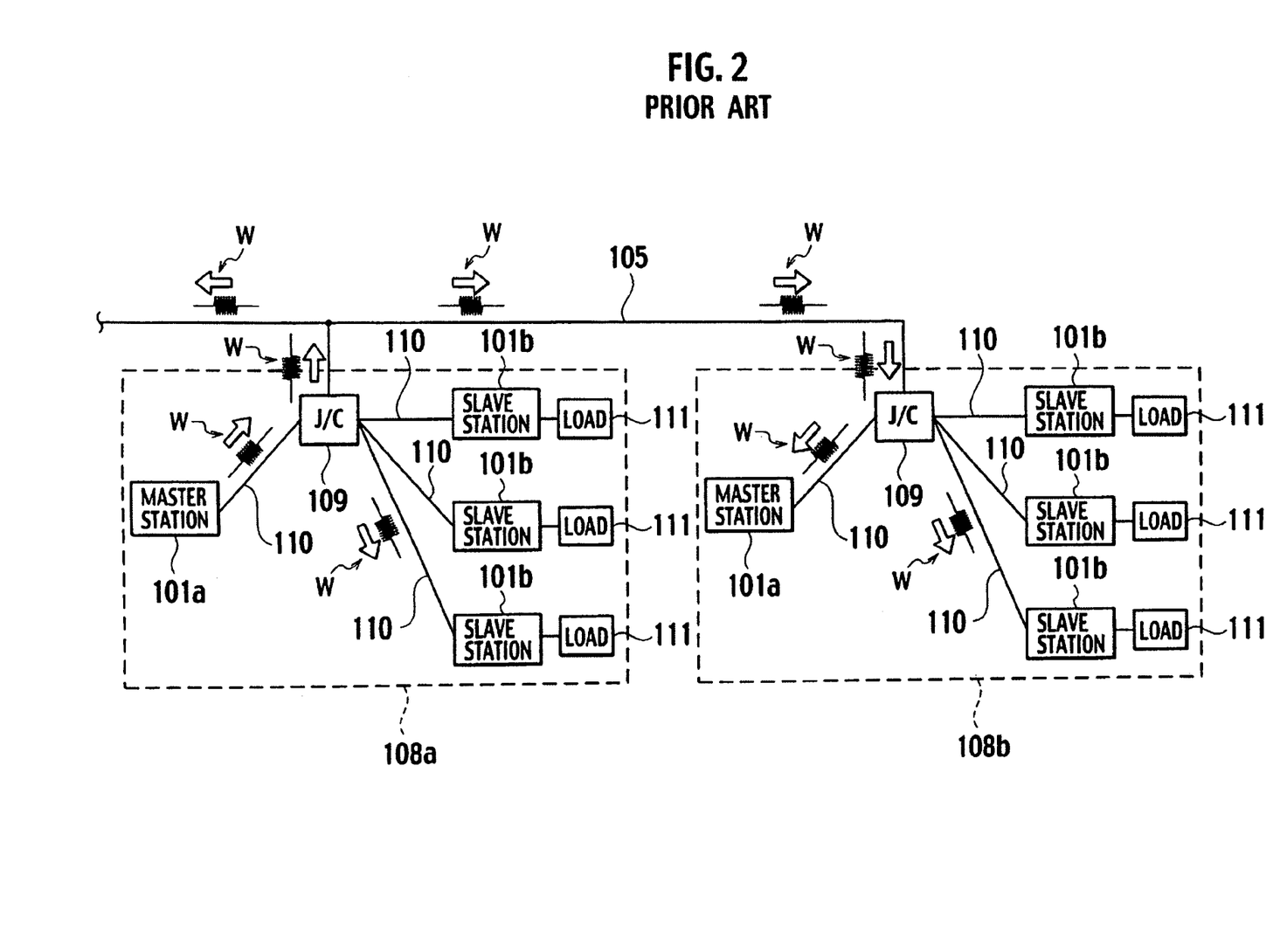
FIG. 2 is an explanatory view showing two communication areas provided adjacent to each other and a state where communication data in a communication area enters the other communication area.

Moreover, the ECUs mounted on the vehicle tend to increase nowadays, in which plural communication areas are set, and power line communication using a PLC apparatus is made in each of the communication areas. Here, the PLC (Power Line Communication) is a mode of enabling communication without a dedicated line by superposing the communication data on the power line. FIG. 2 is a wiring diagram in the case where a first communication area 108a and a second communication area 108b are set for the power line 105.

As shown in this drawing, the first communication area 108a includes a junction connector 109 connected to the power line 105, and plural branch power lines 110 branched from the junction connector 109 are coupled to an ECU 101a serving as a master station and plural ECUs 101b serving as slave stations. Moreover, the respective ECUs 101b are coupled to loads 111 being objects to be controlled. Furthermore, the second communication area 108b also has a similar configuration to the above.

As described above, in the first communication area 108a, the data communication is made among the ECU 101a serving as the master station and the respective ECUs 101b serving as the slave stations through the branch power lines 110.

SUMMARY OF THE INVENTION

However, in such a system including the plural communication areas 108a and 108b as shown in FIG. 2, in the case where the two communication areas 108a and 108b are located adjacent to each other, data communicated in the first communication area 108a sometimes enters the second communication area 108b through the power line 105 coupling the respective communication areas 108a and 108b to each other, thereby causing a problem to interfere with the communication in the second communication area 108b. Meanwhile, in a similar way, data communicated in the second communication area 108b sometimes enters the first communication area 108a through the power line 105, thereby causing a problem to interfere with the communication in the first communication area 108a. Waveforms and arrows W in FIG. 2 represent the communication data and communication directions thereof, respectively, and show a state where the data communicated in the communication area 108a enters the communication area 108b from the communication area 108a.

In order to solve this problem, it is conceivable to interpose a reactance element such as a coil and a capacitor in either a +B line (positive-side wiring) or ground line (negative-side wiring) of the power line 105 connecting the first communication area 108a and the second communication area 108b to each other, thereby allowing the reactance element to exert a filtering function, and preventing a mixture of the data. However, if such a configuration is adopted, then it is necessary to add the element, and an apparatus scale is enlarged, leading to a cost increase of the apparatus. Accordingly, the configuration is not practical.

It is an object of the present invention to provide a vehicular power line communication system capable of preventing a mixture of data between plural communication areas even if the respective communication areas are located adjacent to each other.

In order to achieve the above-described object, a feature of the present invention is summarized in that a vehicular power line communication system includes: plural communication areas; electronic control units provided in the respective communication areas; a battery for supplying electric power to the respective communication areas; a power line coupling the battery and the respective communication areas to each other and for supplying the electric power to the respective communication areas; and branch power lines coupling the respective electronic control units to one another in each of the communication areas, the branch power lines supplying the electric power from the battery to the electronic control units, and superposing communication data thereon, thereby making data communication among the respective electronic control units.

Here, the power line includes a +B line turning to a positive polarity, and a ground line turning to a negative polarity, which are cabled to be spaced from each other in a part of the power line.

According to the feature of the present invention, the +B line and the ground line which constitute the power line are arranged so as to be spaced from each other in a part of the power line. Accordingly, inductance is generated in the portion concerned, and by a filtering function of the inductance, the data in one communication area is shielded from entering the other communication areas. Therefore, the communication data in one communication area can be prevented from entering the other communication areas. In such a way, high quality communication in each of the communication areas is enabled. Moreover, it is unnecessary to use the reactance element such as the coil in order to inhibit the entrance of the communication data. Accordingly, a configuration of the entire system can be simplified, and a cost reduction thereof can be achieved.

Wiring distances of the +B line and the ground line may differ from each other, and the +B line and the ground line may be spaced from each other by detouring either one thereof which is longer.

With the above-described configuration, lengths of the +B line and the ground line are differentiated, the longer wire is detoured from the shorter wire, and the two wires are thus spaced from each other. Therefore, cabling work is facilitated.

The plural communication areas may include: an in-door communication area for use in communication in an inside of a door of a vehicle; and an in-power-seat communication area for use in communication in an inside of a power seat, either one of the +B line and ground line of the power line coupling the in-door communication area and the in-power-seat communication area to each other may be cabled in the power seat, and the +B line and the ground line may be thus spaced from each other.

With the above-described configuration, the communication data of the in-door communication area and the in-power-seat communication area can be surely prevented from entering the areas of each other. Moreover, the +B line or the ground line is cabled in the inside of the seat, and therefore, a detoured portion is not exposed to the outside, thus making it possible to improve an exterior appearance.

A metal portion of a vehicle body may be used for the ground line, a part of the +B line may be cabled away from the metal portion of the vehicle body, and the +B line and the ground line be thus spaced from each other.

With the above-described configuration, the metal portion constituting the vehicle body such as a body is used as the ground line, and the +B line is cabled along the metal portion. In addition, the +B line is spaced from the metal portion in a part thereof. Accordingly, the communication data in one communication area can be prevented from entering the other communication areas, thus enabling the high-quality data communication. Furthermore, the communication data in one communication area can be surely prevented from entering the other communication areas even if the body is used as the ground line in the case of coupling these communication areas separated from each other by a long distance.

The plural communication areas may include a front communication area in which the communication is made on a front side of the vehicle, and a rear communication area in which the communication is made on a rear side of the vehicle, and the +B line of the power line coupling the front communication area and the rear communication area may be cabled along the metal portion of the vehicle body, and be spaced from the metal portion of the vehicle body at a console portion of the vehicle.

With the above-described configuration, the ground line constituting the power line coupling the front communication area provided on the front side of the vehicle and the rear communication area provided on the rear side of the vehicle is set as the metal portion of the vehicle body, and the +B line is detoured by using the console. Accordingly, cabling of the +B line is facilitated, and workability is improved.

DETAILED DESCRIPTION OF THE PREFERRED EMBODIMENT

First and second embodiments of the present invention are described below based on the drawings. In the following description based on the drawings, the same or similar reference numerals are assigned to the same or similar portions.

In a vehicular power line communication system according to the first and second embodiments of the present invention, a +B line and a ground line are spaced from each other in a part of a power line coupling the respective communication areas mounted on a vehicle to one another, thereby generating inductance to impart a role of a filter to the spaced portion. In such a way, communication data in one communication area is prevented from entering the other communication areas.

Specifically, the power line comprises two wires, which are: the +B line turning to the positive polarity; and the ground line turning to the negative polarity, and in usual, these two wires are cabled parallel to each other in the inside of the vehicle; however, the two wires are spaced from each other in a part of a cabled section in this embodiment. In such a way, a state is formed, which becomes substantially equivalent to the case of attaching a reactance element such as a coil into the wire, thereby preventing the entrance of the communication data in one communication area into the other communication areas.

Figure 3A:
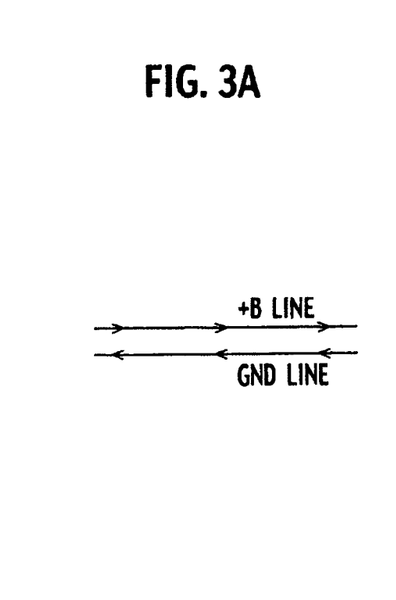
FIGS. 3A to 3C are explanatory views showing a state of a magnetic field generated when a +B line constituting a power line is lengthened more than a ground line constituting the power line according to first and second embodiments of the present invention.
Figure 3B:
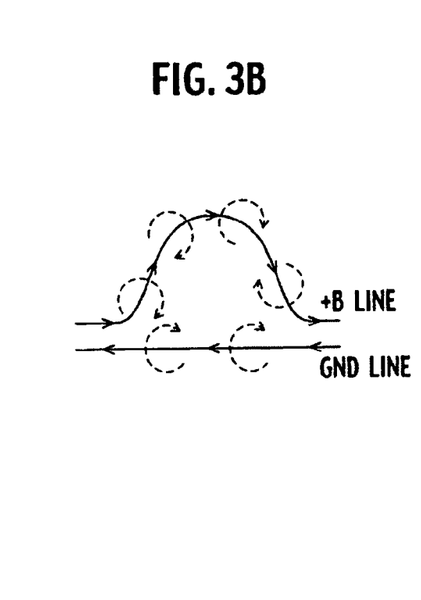
Figure 3C:
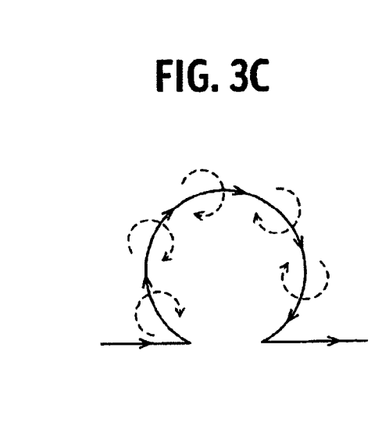

First, a principle to cause the inductance is described. From a state where the +B line and the ground line (hereinafter referred to as a GND line) are cabled parallel to each other as shown in FIG. 3A, the +B line is lengthened more than the GND line and a part thereof is detoured as shown in FIG. 3B. Then, a magnetic field generated by a flow of a current through the +B line and a magnetic field generated by a flow of a current through the GND line differ from each other. As a result, as shown in FIG. 3C, these two wires play a role equivalent to a single-wound coil. Arrows on a solid line represent an orientation of the current, and arrows on dotted lines represent an orientation of a magnetic field generated when the current flows in a direction of the arrows on the solid line.

Figure 4:
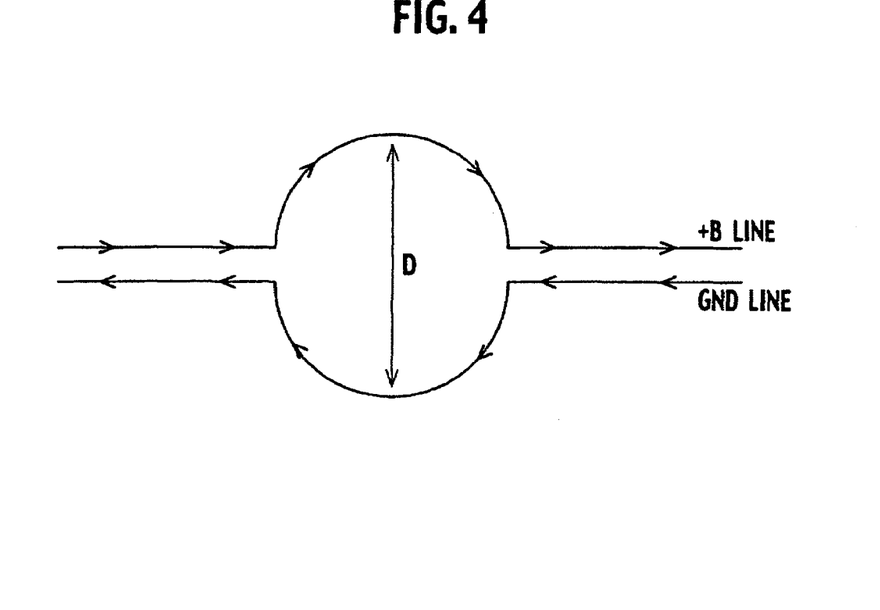
FIG. 4 is an explanatory view showing a state where the +B line and the ground line, which constitute the power line, are spaced from each other according to the first and second embodiments of the present invention.

Moreover, a magnitude of the inductance L(H) generated in this case can be represented by the following Equation (1) when the +B line and a part of the GND line are spaced from each other as shown in FIG. 4.

$$L(H)=k*u*S*n2/x \quad (1)$$

where H is a unit (Henry) of the inductance, k is a Nagaoka coefficient, u is a product of a vacuum magnetic permeability and a relative permeability, S is a cross-sectional area of a coil, n is a winding number of the coil, and x is a length of the coil.

In the case where the above-described Equation (1) is used, when a distance D between the two wires, which is shown in FIG. 4, is 10 [cm], and a diameter of the lines is 1.25 [mm], the inductance becomes 317 n[H]. When the distance D is 20 [cm], and a line diameter is 1.25 [mm], the inductance becomes 662 n[H].

Figure 5A:
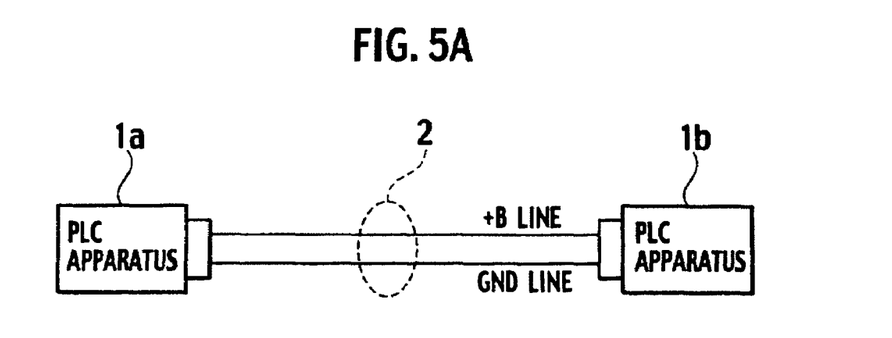
FIGS. 5A and 5B are explanatory views showing a connecting state of the +B line and the ground line when being arranged parallel to each other and an equivalent circuit thereto according to the first embodiment of the present invention.
Figure 5B:
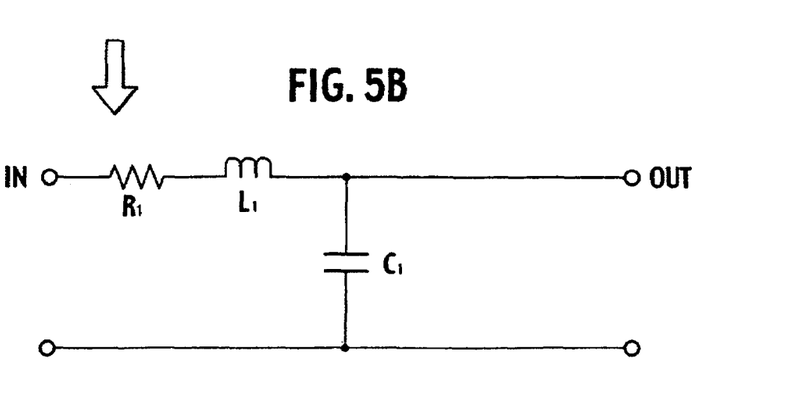

FIGS. 5A and 5B are explanatory views showing a power line 2 cabled between PLC apparatuses 1a and 1b provided in the communication areas different from each other, in which a +B line and a GND line which constitute the power line 2 are cabled parallel to each other. FIG. 5A shows a connecting state of these two lines, and FIG. 5B shows an equivalent circuit thereto. Specifically, the power line 2 has impedance with characteristics derived from a resistor R1, an inductance L1 and an electrostatic capacitor C1.

Figure 6A:
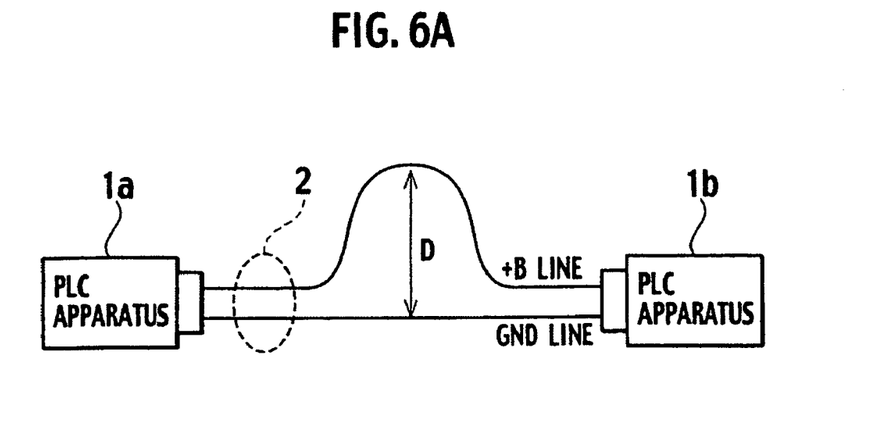
FIGS. 6A to 6C are explanatory views showing a connecting state of the +B line and the ground line where the +B line is partially spaced from the ground line and an equivalent circuit thereto according to the first embodiment of the present invention.
Figure 6B:
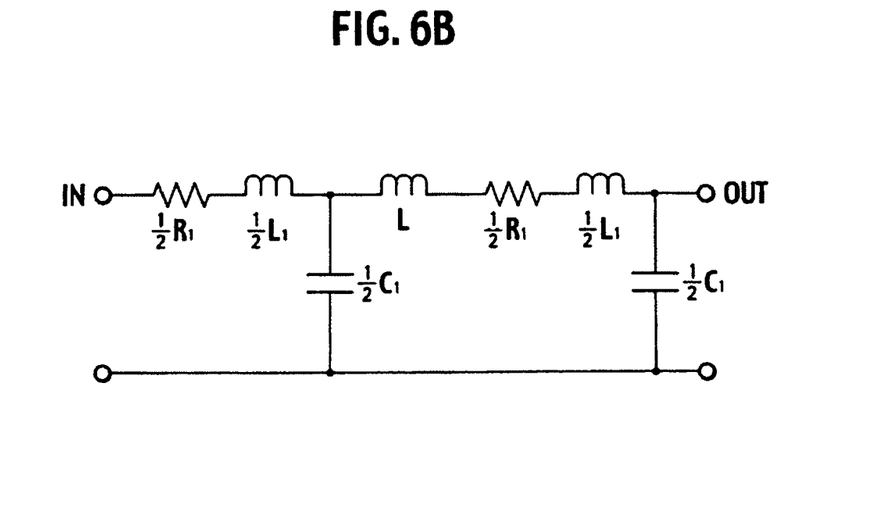
Figure 6C:
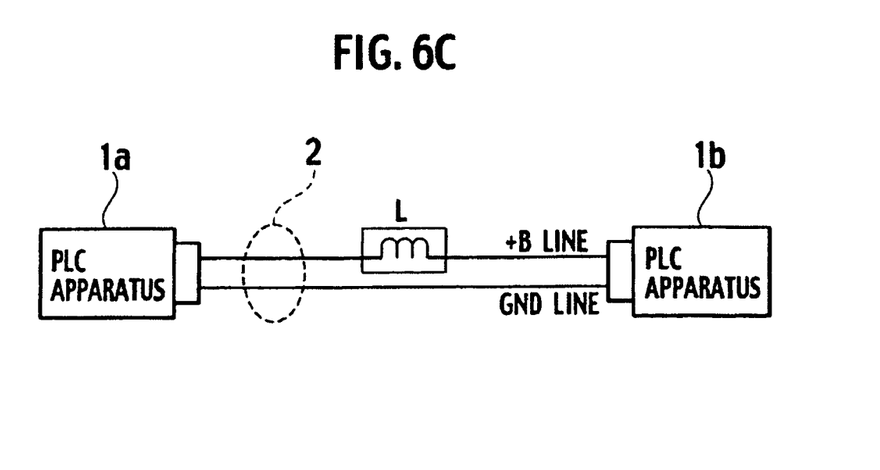

FIGS. 6A to 6C show the case where the +B line is cabled so as to be partially spaced from the GND line in comparison with the case shown in FIGS. 5A and 5B, where the two wires constituting the power line 2 are cabled parallel to each other. FIG. 6A shows a connecting state of the two lines, and FIGS. 6B and 6C show equivalent circuits thereto.

When the distance of the +B line is set longer than the distance of the GND line and a part of the +B line is detoured from the GND line as shown in FIG. 6A, the inductance L is generated in a portion of the detoured +B line as shown in FIG. 6B. As a result, the above-described configuration plays a role equivalent to a configuration in which the inductance L is inserted into the +B line as shown in FIG. 6C.

In the first and second embodiments of the present invention, by using the principle described above, the inductance is generated in the power line 2 connecting the two communication areas (PLC apparatuses) to each other, and the inductance is allowed to function as the filter. In such a way, the communication data in one communication area is prevented from entering the other communication areas.

First Embodiment

Figure 7:
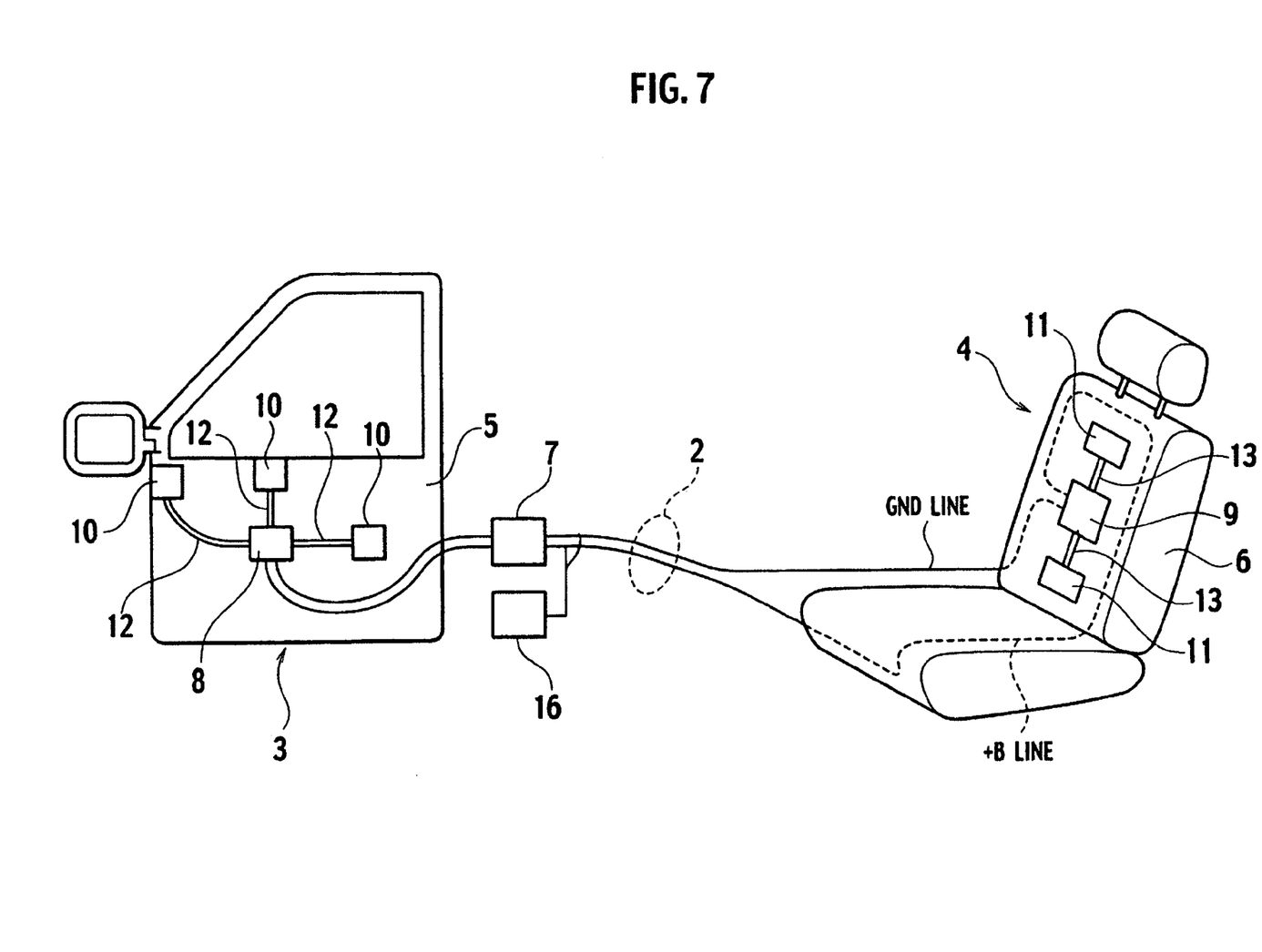
FIG. 7 is an explanatory view showing a configuration of a vehicular power line communication system according to the first embodiment of the present invention.

The first embodiment of the present invention is described below. FIG. 7 is an explanatory view of the case of coupling an in-door communication area 3 disposed in a door 5 mounted on the vehicle and an in-power-seat communication area 4 disposed in a seat 6 mounted on the vehicle to each other by using the power line 2.

In the in-door communication area 3, there are arranged a junction connector 8 and the respective ECUs 10 branched from the junction connector 8 and connected to one another, such as an ECU for controlling a power window, an ECU for controlling a door mirror and an ECU for a door lock. A power supply voltage outputted from a battery 16 is supplied to the respective ECUs 10 through the power line 2 and branch power lines 12. Moreover, communication data among the respective ECUs 10 is superposed on the respective branch power lines 12, and data transmission is thus performed.

Meanwhile, in the in-power-seat communication area 4, there are arranged a junction connector 9 and the respective ECUs 11 branched from the junction connector 9 and connected to one another, such as an ECU for controlling a power seat switch and an ECU for controlling a drive motor. The power supply voltage outputted from the battery 16 is supplied to the respective ECUs 11 through the power line 2 and branch power lines 13. Moreover, communication data among the respective ECUs 11 is superposed on the respective branch power lines 13, and data transmission is thus performed.

Moreover, in the power line 2 coupling these two communication areas 3 and 4, a junction box 7 is provided. The GND line constituting the power line 2 between the junction box 7 and the in-power-seat communication area 4 is cabled on a side of a seated position of the seat 6, and is connected to the junction connector 9. The +B line is cabled in the inside of the seated portion of the seat 6 and the inside of a seat back portion thereof, and is connected to the junction connector 9.

Hence, at this portion, the distance of the +B line and the distance of the GND line differ from each other, and the inductance is generated in the power line 2 based on the above-described principle. In such a way, the communication data of the in-door communication area 3 and the in-power-seat communication area 4 can be prevented from entering the areas of each other.

Figure 8:
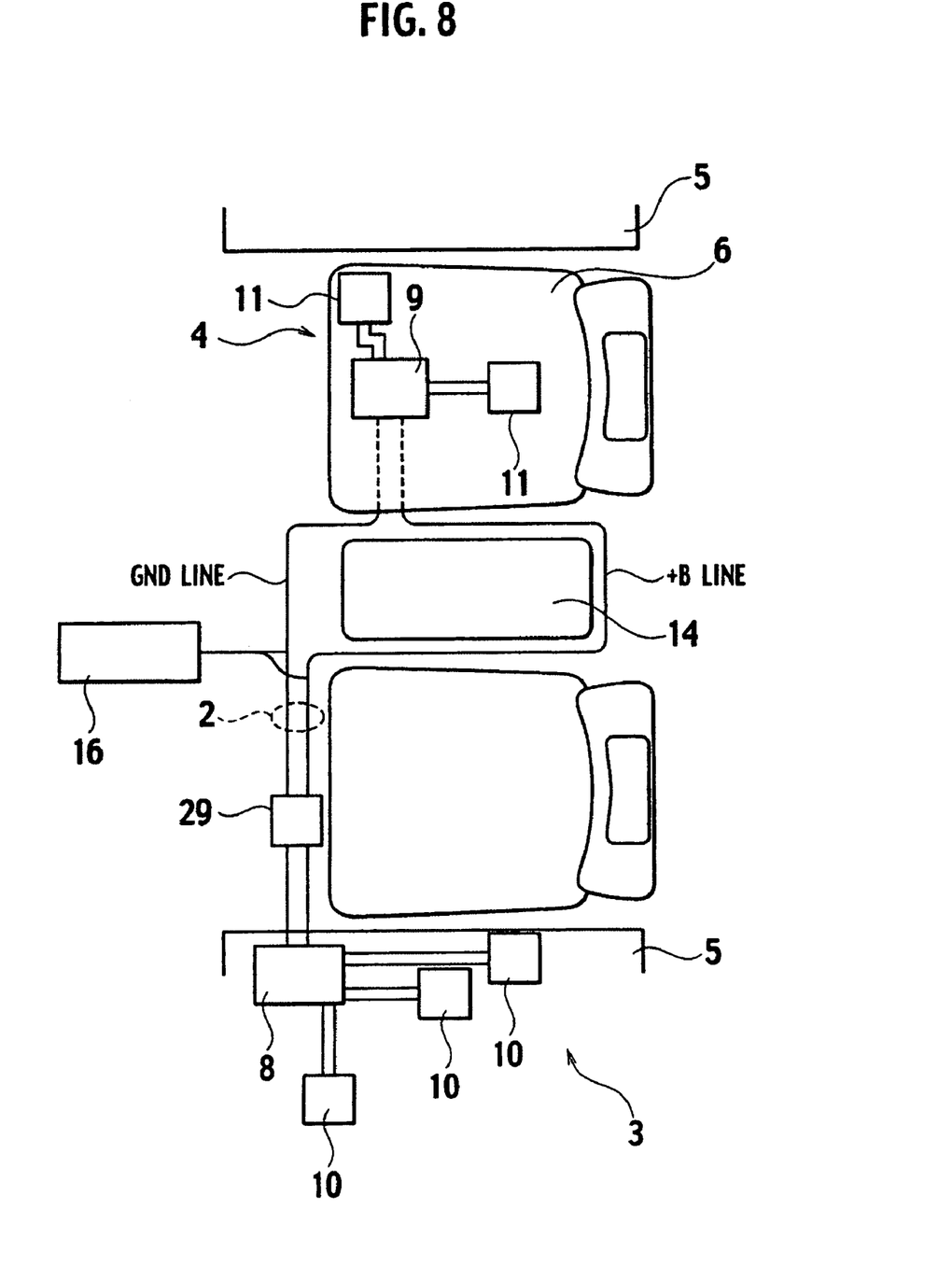
FIG. 8 is an explanatory view showing a configuration of a vehicular power line communication system of a modification example according to the first embodiment of the present invention.

FIG. 8 is a configuration diagram showing a modification example of this embodiment. FIG. 8 is a schematic diagram of a portion of a driver's seat and passenger's seat of the vehicle viewed from the above. This modification example shows the case of coupling the in-power-seat communication area 4 on the driver's seat side and the in-door communication area 3 on the passenger's seat side to each other by using the power line 2. Moreover, the +B line of the power line 2 coupling a junction box 29 and the junction connector 9 on the power seat side to each other is routed through a backside of a console 14, and the GND line thereof is routed through a front side of the console 14. In such a way, at this portion, the +B line and the GND line are spaced from each other.

Hence, as in the embodiment shown in FIG. 7, the inductance can be generated in the power line 2, and the communication data of the in-door communication area 3 and the in-power-seat communication area 4 can be prevented from entering the areas of each other.

As described above, in the vehicular power line communication system according to the first embodiment, the +B line is made longer than the GND line, and the +B line is spaced from the GND line in a part of the cabled section of the power line 2. Accordingly, at this portion, the inductance can be generated in the power line 2. Moreover, the communication data in one communication area can be inhibited from entering the other communication area through the power line 2 by a filtering operation of the inductance concerned. Therefore, the mixture of the data between the communication areas adjacent to each other is avoided, thus enabling high-quality communication.

Moreover, since it is not necessary to separately provide the reactance element such as the coil, a configuration of the entire system can be simplified, and a cost reduction thereof can be achieved.

Note that, though description has been made of the case of differentiating the lengths of the +B line and the GND line and cabling the respective wires through the different routes in the first embodiment, a similar effect can be obtained even if the two wires are arranged parallel to each other with the same length and are cabled so as to be spaced from each other in a part thereof.

Second Embodiment

Next, the second embodiment of the present invention is described below. In the above-described first embodiment, description has been made of the case of using the wire as the GND line of the power line 2. In the second embodiment, description is made of the case of using a metal portion 15 (for example, a body) constituting a vehicle body as a ground, that is, the GND line without using the wire. Basically, a principle in the second embodiment is similar to the principle described with reference to FIGS. 5A to 6C.

Figure 9A:
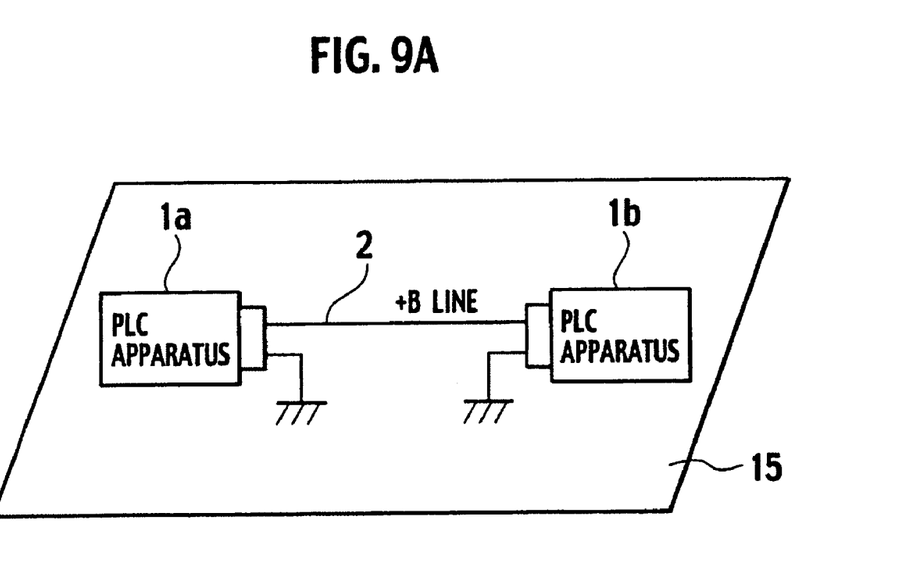
FIGS. 9A and 9B are explanatory views showing a connecting state of the +B line and a metal portion such as a vehicle body as the ground line where the +B line is disposed along the metal portion and an equivalent circuit thereto according to the second embodiment of the present invention.
Figure 9B:
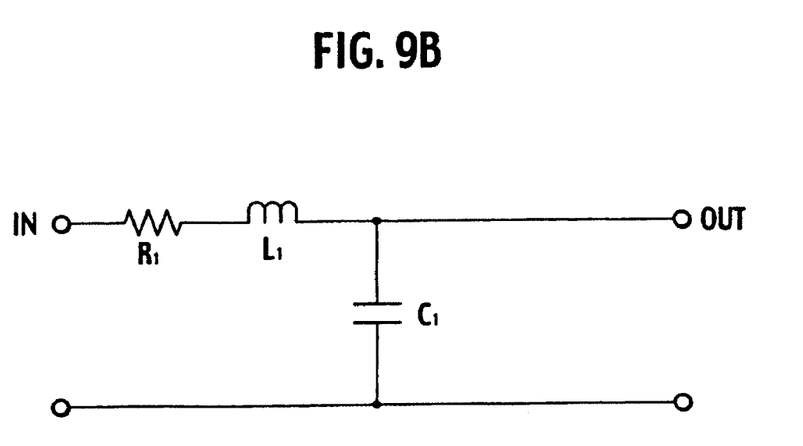

FIGS. 9A and 9B are explanatory views showing the power line 2 cabled between the PLC apparatuses 1a and 1b provided in the communication areas different from each other: FIG. 9A shows a connecting state of the power line 2; and FIG. 9B shows an equivalent circuit thereto. As shown in FIG. 9A, the GND line is set as the vehicle body metal portion 15 such as the body of the vehicle. Moreover, as shown in FIG. 9B, the power line 2 has impedance with characteristics derived from the resistor R1, the inductance L1 and the electrostatic capacitor C1.

Figure 10A:
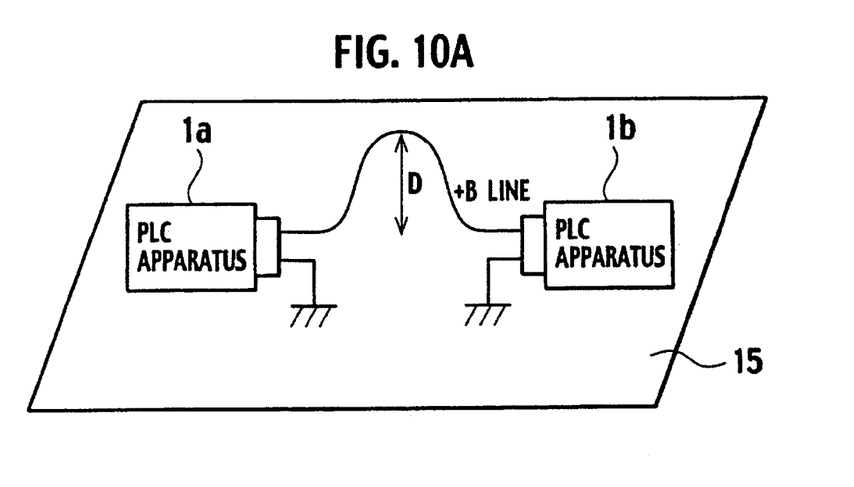
FIGS. 10A to 10C are explanatory views showing a connecting state of the +B line and the metal portion such as the vehicle body as the ground line where the +B line is spaced from the metal portion and an equivalent circuit thereto according to the second embodiment of the present invention.
Figure 10B:
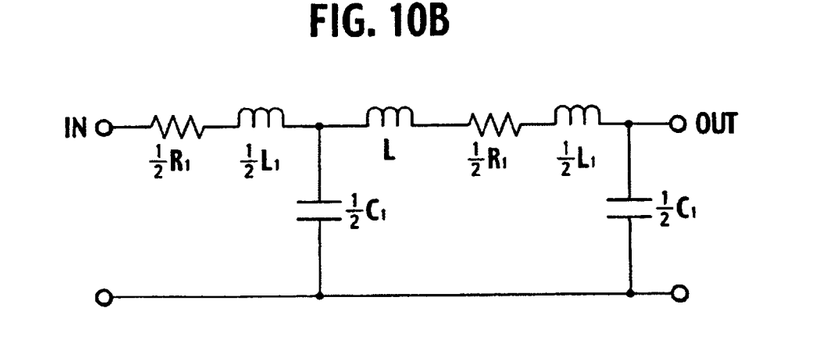
Figure 10C:
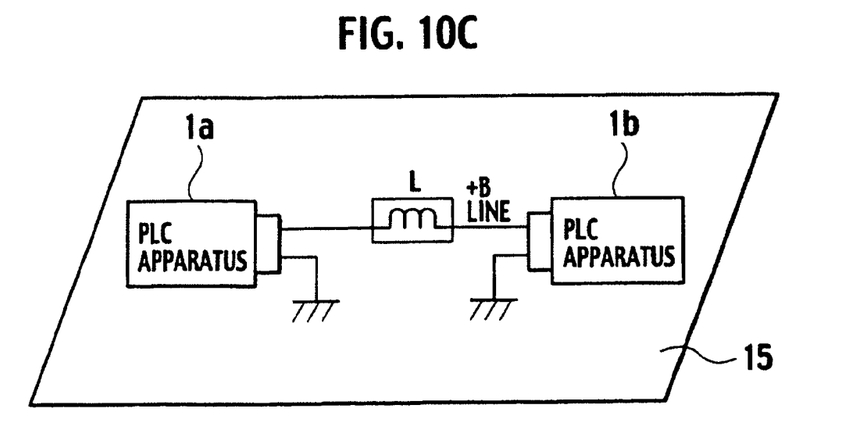

FIGS. 10A to 10C show the case where, in the power line formed of the +B line and the vehicle body metal portion 15, which are as shown in FIG. 9A, the +B line is spaced from the vehicle body metal portion 15 by the distance D in apart thereof. FIG. 10A shows a connecting state of the +B line and the metal portion, and FIGS. 10B and 10C individually show equivalent circuits thereto.

When a part of the +B line is spaced from the vehicle body metal portion 15 as shown in FIG. 10A, the inductance L is generated as shown in FIG. 10B. As a result, the above-described configuration plays a role equivalent to a configuration in which the inductance L is inserted into the +B line as shown in FIG. 10C.

With such a configuration, as in the above-described first embodiment, the filtering function by the inductance acts between the respective communication areas (between the PLC apparatuses 1a and 1b), and the communication data in one communication area can be prevented from entering the other communication area.

Figure 11:
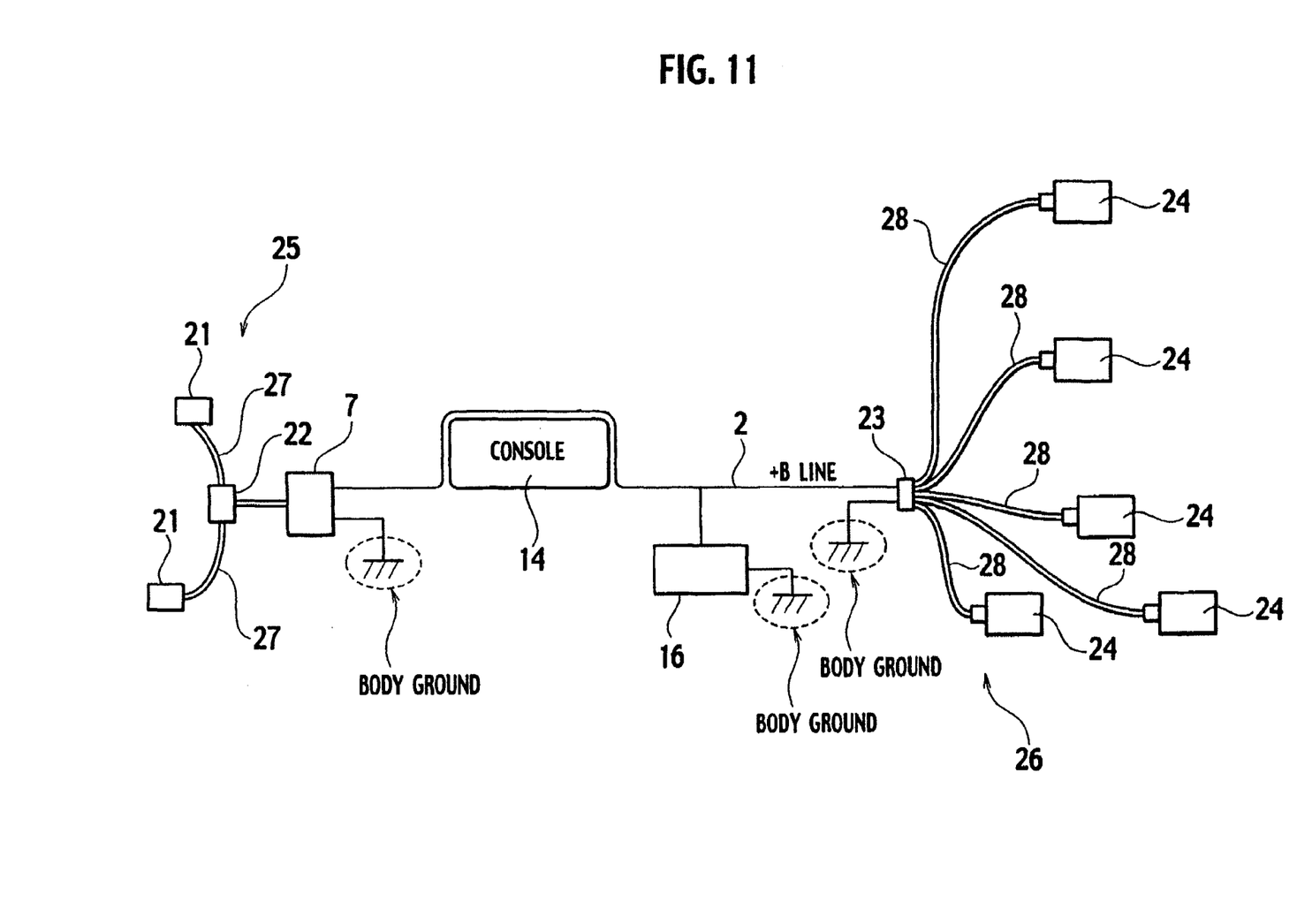
FIG. 11 is an explanatory view showing a configuration of a vehicular power line communication system according to the second embodiment of the present invention.

FIG. 11 is an explanatory view showing a configuration of coupling a front communication area 25 in which the data communication is made among the respective ECUs 21 provided on a front side of the vehicle and a rear communication area 26 in which the data communication is made among the respective ECUs 24 provided on a rear side of the vehicle to each other by using the power line 2.

The front communication area 25 includes a junction connector 22, and the respective ECUs 21 branched from the junction connector 22 and coupled to each other through branch power lines 27.

Meanwhile, the rear communication area 26 includes a junction connector 23, and the respective ECUs 24 branched from the junction connector 23 and coupled to one another through branch power lines 28. The ECUs 24 include an ECU for controlling a stop lump, an ECU for controlling a rear wiper, an ECU for controlling a door opener motor, an ECU for controlling a back lamp, an ECU for a master, and the like.

The junction connector 22 is coupled to the junction-box 7, and the junction box 7 and the junction connector 23 are coupled to each other through the power line 2.

As described above, the power line 2 is formed of the +B line and the vehicle body metal portion 15 as the GND line. In FIG. 11, negative pole sides of power supplies are coupled to each other through the vehicle body as the vehicle body metal portion 15. Moreover, the +B line is cabled along the body, and at a portion on the console 14, which is as a part thereof, the +B line is routed above the console 14, and is thus spaced from the body by the distance D. Although illustration of the body is omitted in FIG. 11, a relationship between the body and the +B line is similar to a relationship between the vehicle body metal portion 15 and the +B line in FIG. 10A. Hence, based on the above-described principle, the inductance is generated at the portion concerned, and the filtering function is exerted, thus making it possible to prevent the data in the front communication area 25 and the rear communication area 26 from entering the areas of each other.

As described above, in the vehicular power line communication system according to the second embodiment of the present invention, the +B line constituting the power line 2 and the vehicle body metal portion 15 such as the body as the GND line are partially spaced from each other. Accordingly, the high-quality data communication can be made in each of the communication areas 25 and 26 as in the above-described first embodiment.

Moreover, in the second embodiment of the present invention, the body as the vehicle body metal portion 15 is utilized as the GND line, and accordingly, the second embodiment is extremely useful when a cabled distance of the power line 2 is long as in the front and rear of the vehicle.

Although the first and second embodiments of the present invention have been described as above, the present invention is not limited to these, and configurations of the respective units can be replaced by arbitrary configurations having similar functions.

What is claimed is:

1. A vehicular power line communication system, comprising:
    plural communication areas;
    electronic control units provided in the respective communication areas;
    a battery for supplying electric power to the respective communication areas;
    a power line coupling the battery and the respective communication areas to each other and for supplying the electric power to the respective communication areas; and
    branch power lines coupling the respective electronic control units to one another in each of the communication areas, the branch power lines supplying the electric power from the battery to the electronic control units, and superposing communication data thereon, thereby making data communication among the respective electronic control units, wherein the power line includes a line having a positive polarity and a ground line cabled to be spaced from each other in a part of the power line, and wherein the line having the positive polarity and the ground line together generate an inductance which prevents data in one communication area from entering into another communication area.

2. The vehicular power line communication system according to claim 1, wherein wiring distances of the line having a positive polarity and the ground line differ from each other, and the line having a positive polarity and the ground line are spaced from each other by detouring either one thereof which is longer.

3. The vehicular power line communication system according to claim 2, wherein the plural communication areas include:

an in-door communication area for use in communication in an inside of a door of a vehicle; and an in-power-seat communication area for use in communication in an inside of a power seat, and either one of the line having a positive polarity and ground line of the power line coupling the in-door communication area and the in-power-seat communication area to each other is cabled in the power seat, and the line having a positive polarity and the ground line are thus spaced from each other.

4. The vehicular power line communication system according to claim 2, wherein a metal portion of a vehicle body is used for the ground line, and a part of the line having a positive polarity is cabled away from the metal portion of the vehicle body, and the line having a positive polarity and the ground line are thus spaced from each other.

5. The vehicular power line communication system according to claim 4, wherein the plural communication areas include a front communication area in which the communication is made on a front side of the vehicle, and a rear communication area in which the communication is made on a rear side of the vehicle, and the line having a positive polarity of the power line coupling the front communication area and the rear communication area is cabled along the metal portion of the vehicle body, and is spaced from the metal portion of the vehicle body at a console portion of the vehicle.

6. The vehicular power line communication system according to claim 1, wherein the inductance is at least 300 H.

7. The vehicular power line communication system according to claim 1, wherein the inductance is at least 600 H.

8. The vehicular power line communication system according to claim 1, wherein the line having a positive polarity and the ground line are separated by at least 10 cm in at least one location of the power line.

9. The vehicular power line communication system according to claim 1, wherein the line having a positive polarity and the ground line are separated by at least 20 cm in at least one location of the power line.

* * * * *